A. FRITZ.
YIELDING TOOL HOLDER.
APPLICATION FILED JAN. 28, 1911.
1,023,073.
Patented Apr. 9, 1912.
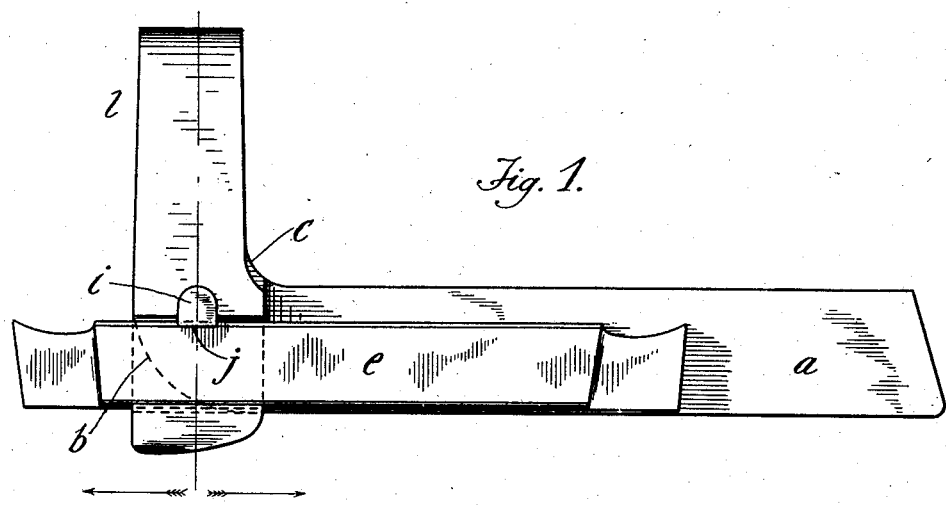
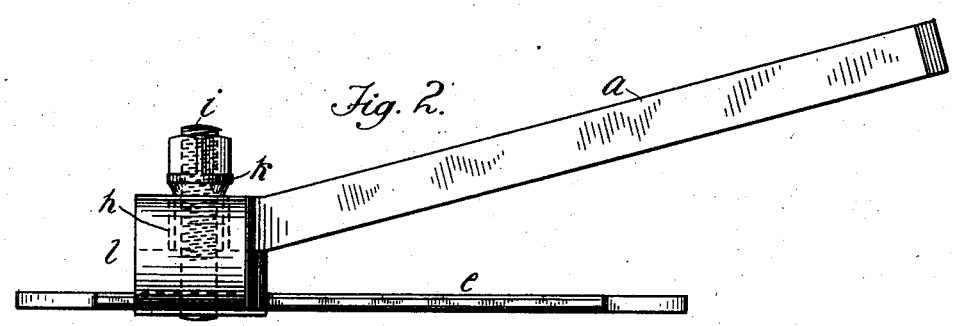
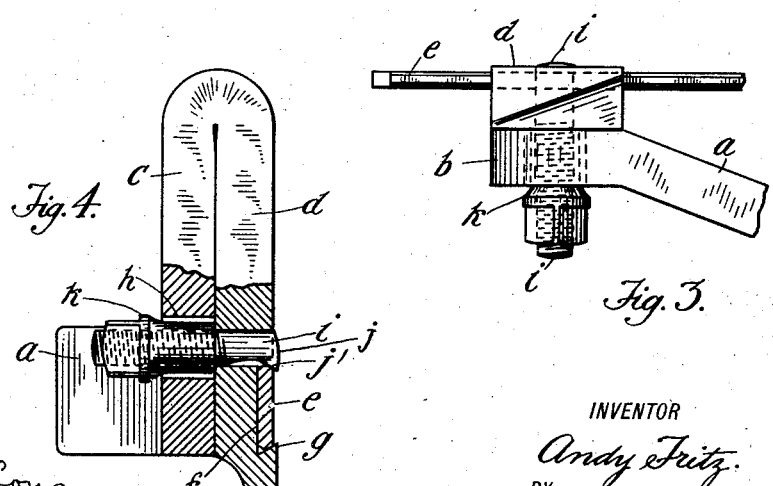
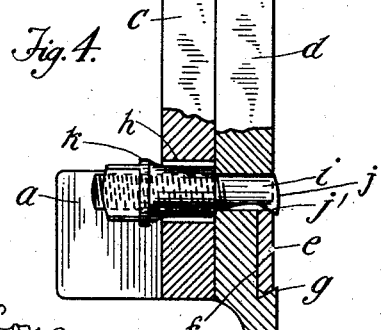
WITNESSES:
Cecil Long
O. Martin.
INVENTOR
Andy Fritz.
BY F. J. Geisler
ATTORNEY

UNITED STATES PATENT OFFICE.

ANDY FRITZ, OF PORTLAND, OREGON.

YIELDING TOOL-HOLDER.

1,023,073. Specification of Letters Patent. Patented Apr. 9, 1912.

Application filed January 28, 1911. Serial No. 605,342.

*To all whom it may concern:*

Be it known that I, ANDY FRITZ, a citizen of the United States, and a resident of Portland, county of Multnomah, and State of Oregon, have invented a new and useful Improvement in Yielding Tool-Holders, of which the following is a specification.

This invention has for its object to provide a yielding tool holder of simple and strong construction, and adapted to permit the tool to yield along a horizontal plane, while more rigidly holding the tool against movement in a vertical plane, since motion in the latter direction frequently causes injury to the part being machined, or the tool.

The construction and operation of my tool holder will be readily understood by having reference to the accompanying drawings constituting a part of the specification.

In such drawings: Figure 1 is a side elevation of my tool holder, showing the same as having a tool affixed therein, as in practice; Fig. 2 is a top view of my tool holder; Fig. 3 is a partial bottom view of my tool holder; and Fig. 4 is a sectional elevation of the left end of my tool holder; the manner in which the tool is held being also illustrated in Figs. 2, 3 and 4.

My tool holder comprises a shank, $a$, curved at $b$ so as to provide a head $l$, comprising a perpendicular part $c$, which is bent over against itself so as to provide a pendent member $d$. In the latter the tool $e$ is secured. In order to properly hold the tool, the member $d$ is formed with a recess $f$, provided at the bottom with an oblique shoulder $g$. The member $c$ is provided with a circular perforation $h$, in which is inserted a clamping screw $i$, formed with a clamping head $j$ having an oblique bearing face $j'$. On the clamping screw $i$ is threaded a sleeve nut $k$. It will be noted that the sleeve nut is of lesser diameter than the circular aperture $h$ of the member $c$, through which it projects, in order that the screw may have some lateral play.

The manner in which the tool is secured is more clearly illustrated in Fig. 4. In order to assure that the tool is securely held in place, it is convenient to make its top and bottom edges with a bevel; then the bottom edge will fit the oblique bearing face of the shoulder $g$, and the top beveled edge of the tool will likewise fit the oblique bearing face $j'$ of the head of the clamping screw $i$. When the parts have been arranged as shown in Fig. 4, by setting up the nut $k$ tightly against the inner face of the head member $d$, the tool is rigidly secured in place. When so secured the holder, by reason of the construction described, permits it to have some motion along the horizontal plane, as illustrated by the arrows, pointing in opposite directions, below Fig. 1.

The bottom of my tool holder is so constructed as to permit the tool post to be set close to the head $l$ of my tool holder, thereby preventing the vibration of the tool holder in a vertical plane, which usually is attended with injury either to the tool, or to the piece being machined. It is, furthermore, to be observed that the construction of my tool holder is so designed that it sets up close to the chuck, and therefore can be used to cut the stock, or piece being machined, flush with the chuck jaws. Another advantage of my tool holder is, that it will not "dig in" nor "chatter," but will cut a shaving of even thickness by reason of being held rigid close up to the work.

I claim:

1. A tool holder consisting of a body comprising a shank having formed at its head-end a perpendicular member and the latter formed with an integral pendent member provided with tool holding means; said pendent member made with an aperture; a clamping screw inserted through such aperture and formed at its extremity to clamp the tool placed in said recess; the parts being adapted to permit the clamping screw to have lateral play in said circular aperture of the pendent member; and a sleeve nut threaded on the shank of the clamping screw and bearing against the inner face of said pendent member.

2. A tool holder consisting of a body comprising a shank having formed at its head-end a perpendicular member and the latter formed with an integral pendent member provided with a tool holding recess; said pendent member made with an aperture; a clamping screw inserted through such aperture and formed at its extremity to clamp the tool placed in said recess; the extremities of said clamping screw formed with a clamping head made with an oblique bearing face; the parts being adapted to permit the clamping screw to have lateral play in said circular aperture of the pendent member; and a sleeve nut threaded on the shank of the clamping screw and bearing against the inner face of said pendent member.

3. A tool holder consisting of a body comprising a shank having formed at its head-end a perpendicular member and the latter formed with an integral pendent member provided with a tool holding recess formed at the bottom with a shoulder, and such shoulder formed with an oblique bearing face; said pendent member made with an aperture; a clamping screw inserted through such aperture and formed at its extremity to clamp the tool placed in said recess; the extremities of said clamping screw formed with a clamping head made with an oblique bearing face; the parts being adapted to permit the clamping screw to have lateral play in said circular aperture of the pendent member; and a sleeve nut threaded on the shank of the clamping screw and bearing against the inner face of said pendent member.

ANDY FRITZ.

Witnesses:
CECIL LONG,
O. O. MARTIN.

Copies of this patent may be obtained for five cents each, by addressing the "Commissioner of Patents, Washington, D. C."